(12) United States Patent
Maruyama

(10) Patent No.: US 12,447,666 B2
(45) Date of Patent: Oct. 21, 2025

(54) IMPRINT APPARATUS AND ARTICLE MANUFACTURING METHOD

(71) Applicant: CANON KABUSHIKI KAISHA, Tokyo (JP)

(72) Inventor: Naoki Maruyama, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 147 days.

(21) Appl. No.: 17/969,909

(22) Filed: Oct. 20, 2022

(65) Prior Publication Data

US 2023/0145758 A1    May 11, 2023

(30) Foreign Application Priority Data

Nov. 10, 2021   (JP) .................................. 2021-183520

(51) Int. Cl.
| | | |
|---|---|---|
| *G03F 7/00* | (2006.01) | |
| *B29C 59/00* | (2006.01) | |
| *B29C 59/02* | (2006.01) | |
| *B29C 37/00* | (2006.01) | |

(52) U.S. Cl.
CPC .......... *B29C 59/002* (2013.01); *B29C 59/026* (2013.01); *B29C 2037/903* (2013.01)

(58) Field of Classification Search
CPC ................ B29C 59/002; B29C 59/026; B29C 2037/903
See application file for complete search history.

(56) References Cited

U.S. PATENT DOCUMENTS

2017/0246657 A1    8/2017   Tamura et al.

FOREIGN PATENT DOCUMENTS

JP             2017157639 A      9/2017

*Primary Examiner* — Alison L Hindenlang
*Assistant Examiner* — Erica Hartsell Funk
(74) *Attorney, Agent, or Firm* — ROSSI, KIMMS & McDOWELL LLP

(57) ABSTRACT

An imprint apparatus according to the present invention includes a controller configured to perform a contacting step of moving at least one of a mold holding unit and a substrate holding unit by at least one of a mold driving unit and a substrate driving unit such that a mold and an imprint material on a substrate surface are brought into contact with each other, an obtaining step of obtaining a driving force in a first direction parallel to the substrate surface for the substrate holding unit by the substrate driving unit after performing the contacting step, and a tilt correcting step of rotating the mold holding unit about a second direction perpendicular to the first direction in the substrate surface by the mold driving unit based on a magnitude of the driving force obtained in the obtaining step.

17 Claims, 5 Drawing Sheets

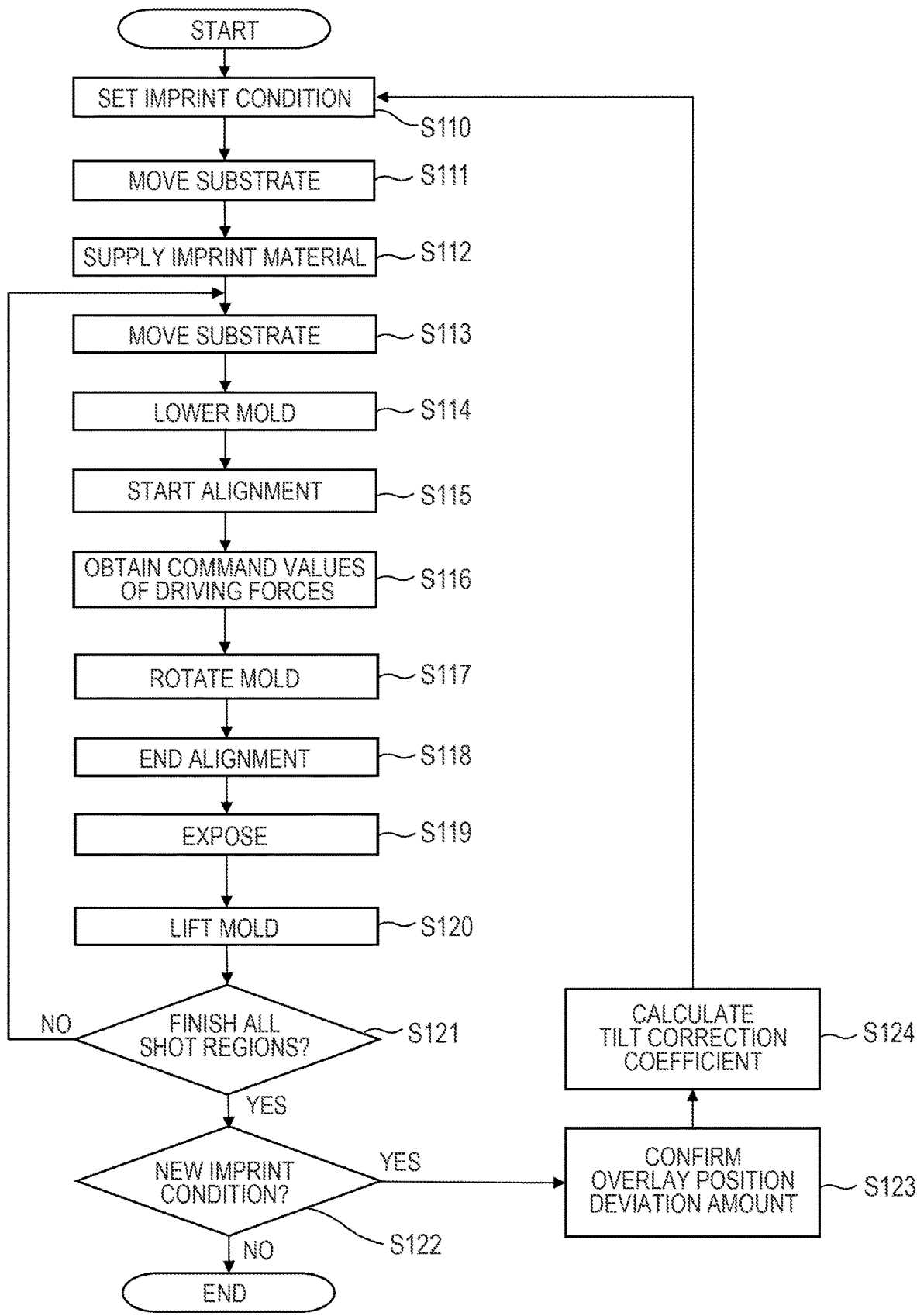

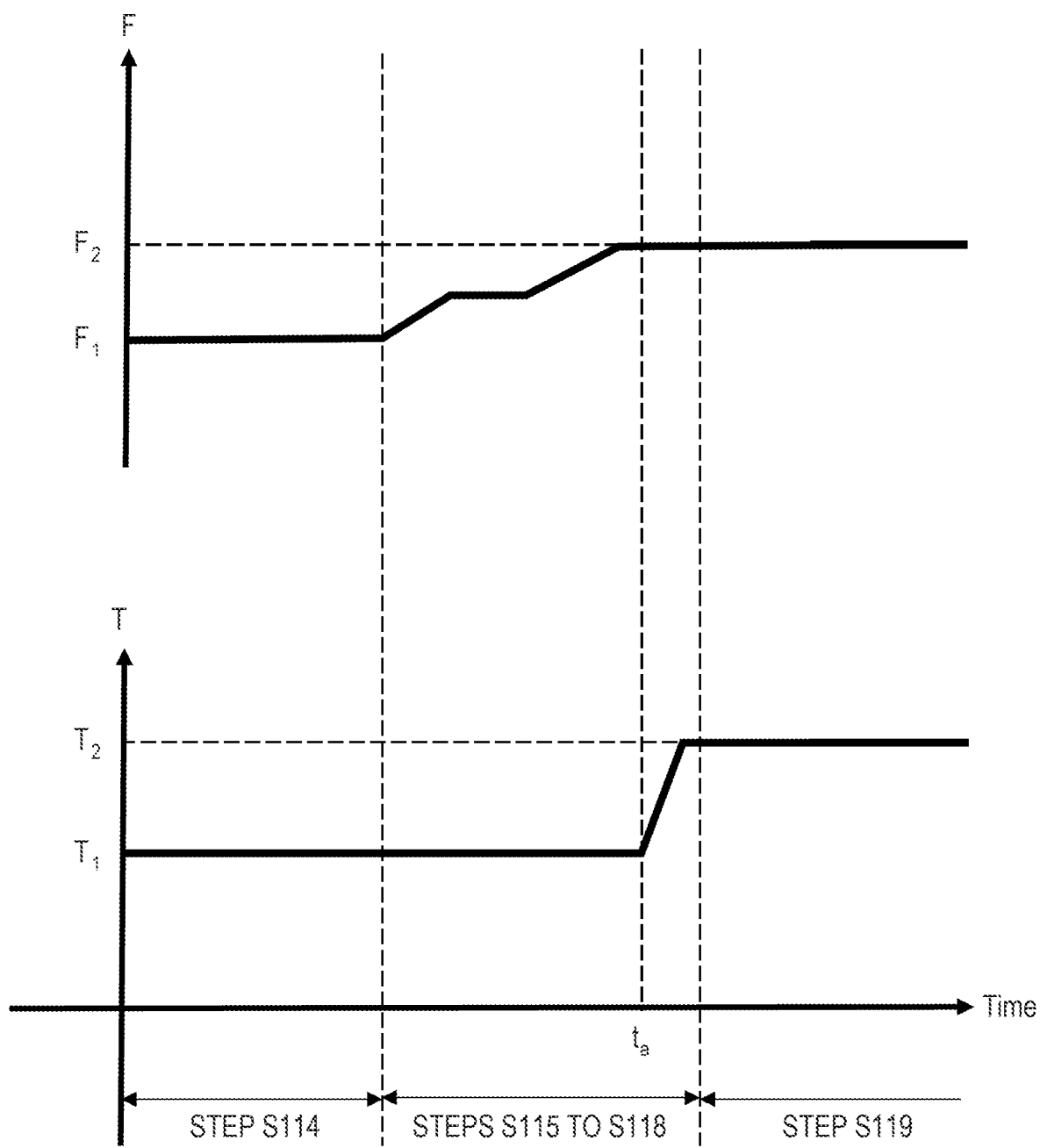

IMPRINT APPARATUS AND ARTICLE MANUFACTURING METHOD

BACKGROUND OF THE INVENTION

Field of the Invention

The present invention is related to an imprint apparatus.

Description of the Related Art

Conventionally, there has been a demand for improving an overlay accuracy by reducing a distortion caused by a relative tilt between a mold and a substrate when a pattern of an imprint material is formed in an imprint apparatus.

Japanese Patent Application Laid-Open No. 2017-157639 discloses an imprint apparatus which changes a tilt of a mold based on a contact position of the mold in a surface direction of a substrate in order to reduce a relative tilt between the mold and the substrate due to a tilt of a substrate holding unit which holds the substrate when the mold and an imprint material on the substrate are brought into contact with each other.

As described above, the method disclosed in Japanese Patent Application Laid-Open No. 2017-157639 is effective in reducing the relative tilt between the mold and the substrate caused by the tilt of the substrate holding unit.

However, in the imprint apparatus, it is known that the relative tilt between the mold and the substrate changes not only by the above but also by a thickness of the imprint material on the substrate or a pressing force of the mold when the mold is brought into contact with the imprint material on the substrate, for example.

SUMMARY OF THE INVENTION

An object of the present invention is to provide an imprint apparatus capable of effectively reducing a relative tilt between a mold and a substrate when a pattern of an imprint material is formed.

The imprint apparatus according to the present invention is an imprint apparatus for forming a pattern of an imprint material on a substrate surface of a substrate by using a mold, in which the imprint apparatus includes a mold holding unit configured to hold the mold, a mold driving unit configured to move the mold holding unit, a substrate holding unit configured to hold the substrate, a substrate driving unit configured to move the substrate holding unit, and a controller configured to control the mold driving unit and the substrate driving unit. The controller is configured to perform a contacting step of moving at least one of the mold holding unit and the substrate holding unit by at least one of the mold driving unit and the substrate driving unit such that the mold and the imprint material on the substrate surface are brought into contact with each other, an obtaining step of obtaining a driving force in a first direction parallel to the substrate surface for the substrate holding unit by the substrate driving unit after performing the contacting step, and a tilt correcting step of rotating the mold holding unit about a second direction perpendicular to the first direction in the substrate surface by the mold driving unit based on a magnitude of the driving force obtained in the obtaining step.

Further features of the present invention will become apparent from the following description of exemplary embodiments with reference to the attached drawings.

BRIEF DESCRIPTION OF THE DRAWINGS

FIG. 3 is a flowchart showing an imprint process in the imprint apparatus according to the first embodiment.

FIG. 4 is a graph illustrating an example of time dependence of each of a driving force of an actuator and a tilt variation amount of a mold holding unit in some steps in an imprint process performed by the imprint apparatus according to the first embodiment.

DESCRIPTION OF THE EMBODIMENTS

Figure 1:
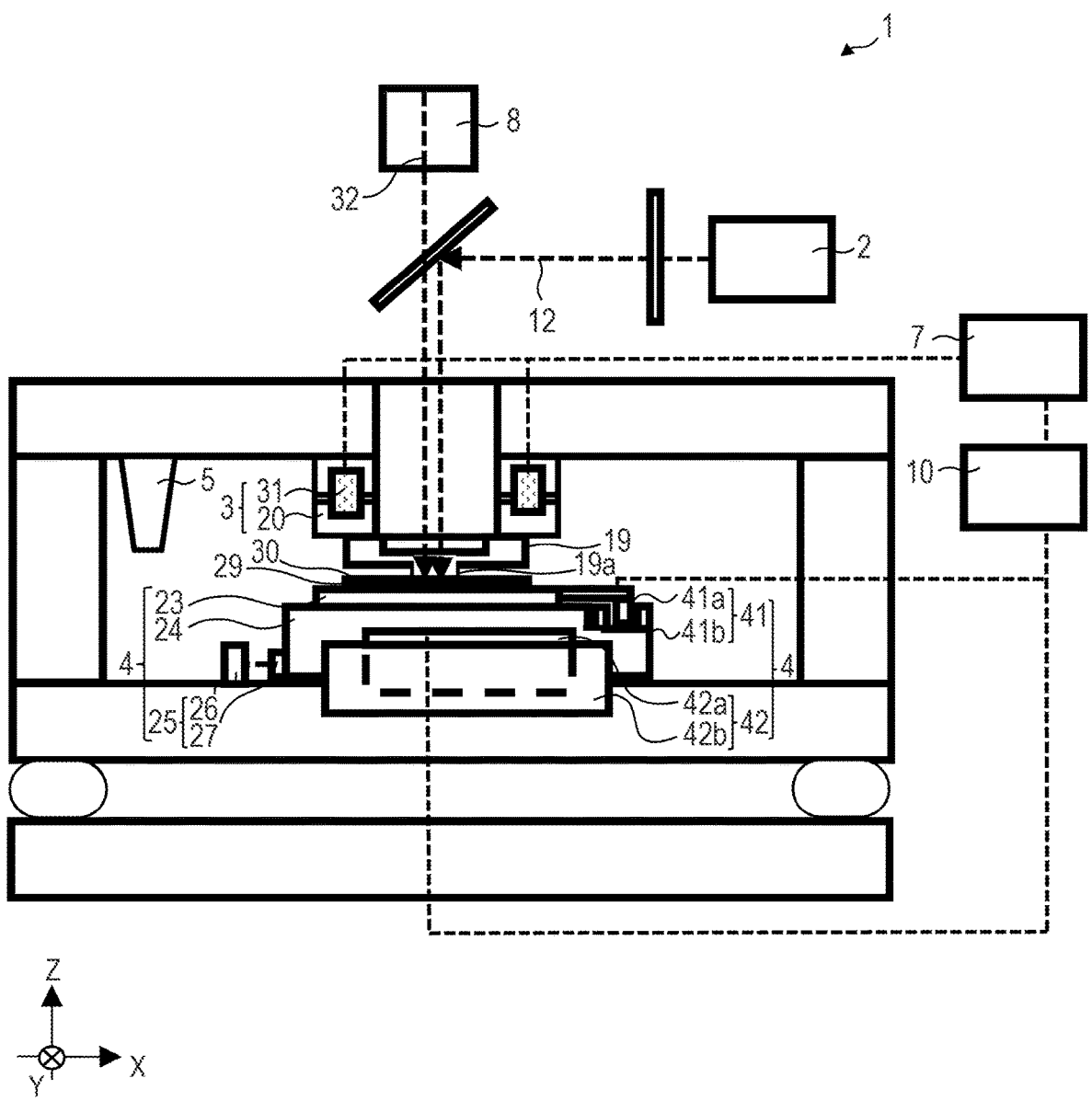
FIG. 1 is a schematic cross-sectional view of an imprint apparatus according to a first embodiment of the present invention.

Hereinafter, an imprint apparatus according to the present invention is described in detail with reference to the accompanying drawings. The drawings described below may be drawn on a scale different from the actual scale in order to facilitate understanding of the present invention.

First Embodiment

In response to a recent demand for further miniaturization in semiconductor devices, micro electro mechanical systems (MEMS) or the like, an imprint technique capable of forming a fine pattern (structure) on the order of several nanometers on a substrate has attracted attention in addition to a conventional photolithography technique.

Specifically, the imprint technique is a microfabrication technique to form a pattern of an imprint material corresponding to a fine concave-convex pattern formed on a mold, on a substrate by supplying (coating) an uncured imprint material onto the substrate, bringing the imprint material into contact with the mold, and curing the imprint material.

There is a photocuring method as one method for curing an imprint material in the imprint technique.

The photocuring method is a method of forming a pattern of an imprint material on a substrate by curing the imprint material supplied to a shot region on the substrate by irradiating the imprint material with light such as ultraviolet light in a state in which the imprint material and a pattern region of a mold are brought into contact with each other.

In addition, there is known a method to suppress remaining of bubbles in a pattern region of a mold by deforming the pattern region of the mold into a convex shape so as to protrude toward a substrate, and bringing the mold and an imprint material on the substrate into contact with each other.

In general, when the mold and the imprint material on the substrate are brought into contact with each other, at least one of the mold and the substrate is controlled such that a relative tilt between the mold and the substrate becomes zero, namely a surface of the mold on which a pattern is formed and a substrate surface become parallel to each other.

However, when the mold and the substrate are brought into contact with each other in a state in which the pattern region of the mold is deformed into a convex shape as described above, it is difficult to make the relative tilt between the mold and the substrate zero due to a warpage of the substrate, a deformation according to a rigidity of the substrate holding unit, and an imprint condition including a position of a shot region.

Accordingly, a technique has been proposed for reducing a moment which changes the relative tilt between the mold and the substrate generated when the mold and the imprint material on the substrate are brought into contact with each other.

Specifically, in the above-described technique, an imprint process is performed on a test substrate in advance, and a moment is obtained in each period such as an imprint period in which a mold is brought into contact with an imprint material on the substrate or a filling period in which a pattern region of the mold is filled with the imprint material. Further, a target value of the relative tilt at which the moment falls within an allowable range is determined.

In the imprint process on the subsequent substrate, the moment can be reduced by bringing the mold and the imprint material on the substrate into contact with each other after setting the relative tilt between the mold and the substrate so as to be the determined target value.

Although a method of performing a correction using a result acquired by performing the imprint process in advance as in the above-described technique is useful, a robustness is low since a factor causing the moment is not accurately found in the first place.

That is, when the imprint process is performed under an imprint condition which is slightly different from that in the imprint process performed in advance, the difference affects the relative tilt between the mold and the substrate, and thus it becomes difficult to reduce the moment.

As a result of intensive studies, the inventors of the present application have focused on the fact that a movement of the substrate holding unit after the mold and the substrate are brought into contact with each other is one of factors which generate the moment.

Accordingly, an object of the present invention is to provide the imprint apparatus capable of effectively reducing the relative tilt between the mold and the substrate based on a driving force applied to a substrate stage in the movement of the substrate holding unit.

FIG. 1 shows a schematic cross-sectional view of an imprint apparatus 1 according to a first embodiment of the present invention.

The imprint apparatus 1 according to the present embodiment is used to manufacture a device such as a semiconductor device as an article. Specifically, the imprint apparatus 1 is a lithography apparatus which performs an imprint process of forming a pattern of an imprint material 30 on a substrate 29 by using a mold 19.

Specifically, in the imprint apparatus 1 according to the present embodiment, an energy for curing is applied to the imprint material 30 after the imprint material 30 supplied onto the substrate 29 and the mold 19 are brought into contact with each other. Thereby, a pattern of a cured product to which a concave-convex pattern of the mold 19 is transferred can be formed.

As shown in FIG. 1, the imprint apparatus 1 according to the present embodiment includes an illuminating unit 2, a mold holding mechanism 3, a substrate stage 4, a supplying unit 5, a mold controller 7 (a controller), an alignment measuring unit 8 (a position measuring unit), and a substrate controller 10 (a controller).

A curable composition (also referred to as an uncured resin) which is cured by an application of the energy for curing is used as the imprint material 30 used in the imprint apparatus 1 according to the present embodiment.

As the energy for curing, an electromagnetic wave, a heat or the like is used. As the electromagnetic wave, light such as infrared rays, visible rays or ultraviolet rays having a wavelength selected from a range between 10 nm and 1 mm is used, for example.

That is, the curable composition is a composition which is cured by a light irradiation or heating.

In particular, a photocurable composition which is cured by the light irradiation contains at least a polymerizable compound and a photopolymerization initiator, and may contain a non-polymerizable compound or a solvent as necessary.

The term "non-polymerizable compound" herein refers to at least one compound selected from a group consisting of a sensitizer, a hydrogen donor, an internal release agent, a surfactant, an antioxidant and a polymer component.

In the imprint apparatus 1 according to the present embodiment, the imprint material 30 may be coated in a film form onto the substrate 29 by a spin coater or a slit coater forming the supplying unit 5.

Alternatively, the imprint material 30 may be coated onto the substrate 29 in the form of a droplet, an island formed by connecting a plurality of droplets, or a film by a liquid injecting head forming the supplying unit 5.

The viscosity (at 25° C.) of the imprint material 30 used in the imprint apparatus 1 according to the present embodiment is 1 mPa·s or more and 100 mPa·s or less, for example.

In the imprint apparatus 1 according to the present embodiment, a glass, a ceramic, a metal, a semiconductor, a resin or the like may be used as a material of the substrate 29, and a member made of a material different from that of the substrate 29 may be formed on a surface of the substrate 29 as necessary.

Specifically, the substrate 29 used in the imprint apparatus 1 according to the present embodiment includes a silicon wafer, a compound semiconductor wafer and quartz glass.

The imprint apparatus 1 according to the present embodiment employs a photocuring method as a method for curing the imprint material 30.

A direction parallel to an optical axis of the illuminating unit 2 which irradiates the imprint material 30 on the substrate 29 with curing light 12 (a direction perpendicular to a substrate surface) is defined as a Z axis, and two directions orthogonal to each other in a plane perpendicular to the Z axis (in the substrate surface) are defined as an X axis and a Y axis (a first direction and a second direction).

As shown in FIG. 1, the mold holding mechanism 3 includes a mold holding unit 20 which holds the mold 19, a mold base which holds the mold holding unit 20, and a mold driving unit 31 which moves the mold holding unit 20 with respect to the mold base.

The mold holding unit 20 sucks to hold the mold 19 by attracting an outer peripheral region of a surface of the mold 19 on which the curing light 12 is incident by a vacuum suction or an electrostatic force.

For example, when the mold holding unit 20 holds the mold 19 by a vacuum suction force, the mold holding unit 20 is connected to a vacuum pump (not illustrated) provided outside, and an attachment and a detachment (holding and releasing) of the mold 19 can be switched by turning on and off the vacuum pump.

The mold driving unit 31 moves the mold holding unit 20 which holds the mold 19 in the Z direction so as to selectively press the mold 19 against the imprint material 30 on the substrate 29 (an imprint process) and separate the mold 19 from the imprint material 30 on the substrate 29 (a mold releasing process).

Actuators applicable to the mold driving unit 31 include a linear motor and an air cylinder, for example.

The mold driving unit 31 may be formed by a plurality of driving systems including a coarse movement driving system, a fine movement driving system and the like in order to position the mold 19 with a high accuracy.

The mold driving unit 31 is configured to be capable of moving the mold 19 in the X direction and the Y direction in addition to the Z direction.

Further, the mold driving unit 31 is configured to have a tilt function for adjusting a position of the mold 19 in a $\theta_Z$ direction (a rotation direction around the Z axis) and positions of the mold 19 in a $\theta_X$ direction and a $\theta_Y$ direction (a rotation direction around the X axis and a rotation direction around the Y axis) corresponding to tilts of the mold 19.

Note that although the imprint process and the mold releasing process in the imprint apparatus 1 according to the present embodiment are performed by moving the mold 19 in the Z axis direction, the present invention is not limited thereto, and they may be performed by moving the substrate 29 (namely, the substrate stage 4) in the Z axis direction.

Alternatively, they may be performed by relatively moving both of the mold 19 and the substrate 29 in the Z axis direction.

In each of the mold holding unit 20, the mold base, and the mold driving unit 31 forming the mold holding mechanism 3, an opening is formed on the inside including a central portion such that the imprint material 30 on the substrate 29 is irradiated with the curing light 12 from the illuminating unit 2.

A light transmitting member for sealing a space surrounded by a part of the opening and the mold 19 is arranged in the opening, and a pressure in the sealed space is adjusted by a pressure adjusting device (not illustrated) including a vacuum pump or the like.

For example, when the imprint material 30 on the substrate 29 and the mold 19 are brought into contact with each other, the pressure adjusting device can deflect (deform) a pattern region 19a of the mold 19 into a convex shape toward the substrate 29 by increasing the pressure in the sealed space higher than an external pressure.

Accordingly, the mold 19 can be brought into contact with the imprint material 30 on the substrate 29 from a central portion of the pattern region 19a of the mold 19.

Thereby, it is possible to suppress air from remaining between the pattern region 19a of the mold 19 and the imprint material 30 during the contact, and to fill the imprint material 30 into every corner of the pattern region 19a of the mold 19.

The imprint apparatus 1 according to the present embodiment can form the pattern of the mold 19 on the imprint material 30 on the substrate 29 as described above.

The substrate stage 4 can perform an alignment of the substrate 29 with respect to the mold 19 when the pattern of the imprint material 30 is formed on the substrate 29 by moving with holding the substrate 29.

As shown in FIG. 1, the substrate stage 4 includes a Y stage 23 (a substrate holding unit) which sucks to hold the substrate 29 and is movable at least in the Y direction, and an X stage 24 (a substrate holding unit) which mechanically holds the Y stage 23 and is movable at least in the X direction.

Further, the substrate stage 4 includes an encoder system 25, a Y actuator 41 (a substrate driving unit) and an X actuator 42 (a substrate driving unit).

The Y stage 23 can be moved by driving a Y actuator 41 including a Y movable unit 41a and a Y fixed unit 41b, and the X stage 24 can be moved by driving an X actuator 42 including an X movable unit 42a and an X fixed unit 42b.

For example, a linear motor or a planar motor can be used as the Y actuator 41 and the X actuator 42.

Note that each of the Y stage 23 and the X stage 24 may be formed by a plurality of stages including a coarse moving stage, a fine moving stage and the like in order to position the substrate 29 with a high accuracy.

The X stage 24 may be configured to be capable of moving the substrate 29 in the Z direction.

In addition, the X stage 24 may be configured to have a tilt function for adjusting a position of the substrate 29 in the $\theta_Z$ direction and positions of the substrate 29 in the $\theta_X$ direction and the $\theta_Y$ direction corresponding to tilts of the substrate 29.

The encoder system 25 corresponding to the X direction, the Y direction and the Z direction are arranged on side surfaces of the Y stage 23 and the X stage 24.

The encoder system 25 measures respective positions of the Y stage 23 and the X stage 24 in real time by irradiating an encoder scale 26 with a beam from an encoder head 27.

Then, the substrate controller 10 performs positioning of each of the Y stage 23 and the X stage 24 based on a measured value of the encoder system 25.

The alignment measuring unit 8 irradiates the mold 19 and the substrate 29 with alignment light 32 and detects it reflected by the mold 19 and the substrate 29 when positioning of the substrate 29 with respect to the mold 19 is performed.

Thereby, a relative position deviation amount between the mold 19 and the substrate 29 can be measured by measuring a position in the substrate surface of an alignment mark (a first mark) formed on the mold 19 and a position in the substrate surface of an alignment mark (a second mark) formed on the substrate 29.

The relative position deviation amount measured here is used when the mold driving unit 31 moves the mold holding unit 20, or the Y actuator 41 and the X actuator 42 move the Y stage 23 and the X stage 24 to reduce the relative position deviation between the mold 19 and the substrate 29.

It is also possible to reduce the relative position deviation between the mold 19 and the substrate 29 by deforming a shape of the pattern region 19a of the mold 19 or a shape of a shot region on the substrate 29 by a shape correcting unit (not illustrated).

The supplying unit 5 supplies (applies) the imprint material 30 onto the substrate surface of the substrate 29 which has moved immediately below. The supplying unit 5 may supply the imprint material 30 to the entire substrate surface of the substrate 29 all at once, or may supply the imprint material 30 to each shot region arranged in a line or to each shot region on which the imprint process is performed.

When the imprint material 30 is supplied to the entire substrate surface of the substrate 29 in advance before the substrate 29 is carried into the imprint apparatus 1 according to the present embodiment, the supplying unit 5 may not be provided.

The controller including the mold controller 7 and the substrate controller 10 is formed by a computer including a CPU, a memory and the like, and controls each unit of the imprint apparatus 1 in accordance with a program stored in the memory.

Specifically, the mold controller 7 controls the imprint process of forming the pattern of the imprint material 30 on the substrate 29 by controlling an operation, an adjustment or the like of each unit of the imprint apparatus 1.

The substrate controller 10 controls the substrate stage 4 to move the substrate stage 4 to a supplying area of the supplying unit 5 for supplying the imprint material 30 to the substrate 29 or a position for bringing the substrate 29 into contact with the mold 19.

Further, the substrate controller 10 issues a command to the Y actuator 41 and the X actuator 42 in order to perform positioning by moving the substrate 29 relative to the mold 19 in the X direction and the Y direction after bringing the mold 19 and the substrate 29 into contact with each other.

As shown in FIG. 1, the imprint apparatus 1 according to the present embodiment includes a stage base plate on which the substrate stage 4 is placed, a bridge base plate which fixes the mold holding mechanism 3, and support columns which are supported by the stage base plate and supports the bridge base plate.

In addition, vibration isolating units are arranged on a base plate supported by a floor in the imprint apparatus 1 according to the present embodiment, and the vibration isolating units support the stage base plate to reduce a vibration propagating from a floor surface to the stage base plate.

Further, the imprint apparatus 1 according to the present embodiment includes a mold conveying unit (not illustrated) which conveys the mold 19 to the mold holding mechanism 3 from the outside, a substrate conveying unit (not illustrated) which conveys the substrate 29 to the substrate stage 4 from the outside, and the like.

Next, an operation performed after bringing the mold 19 and the imprint material 30 on the substrate 29 into contact with each other in the imprint process performed by the imprint apparatus 1 according to the present embodiment is described.

Figure 2A:
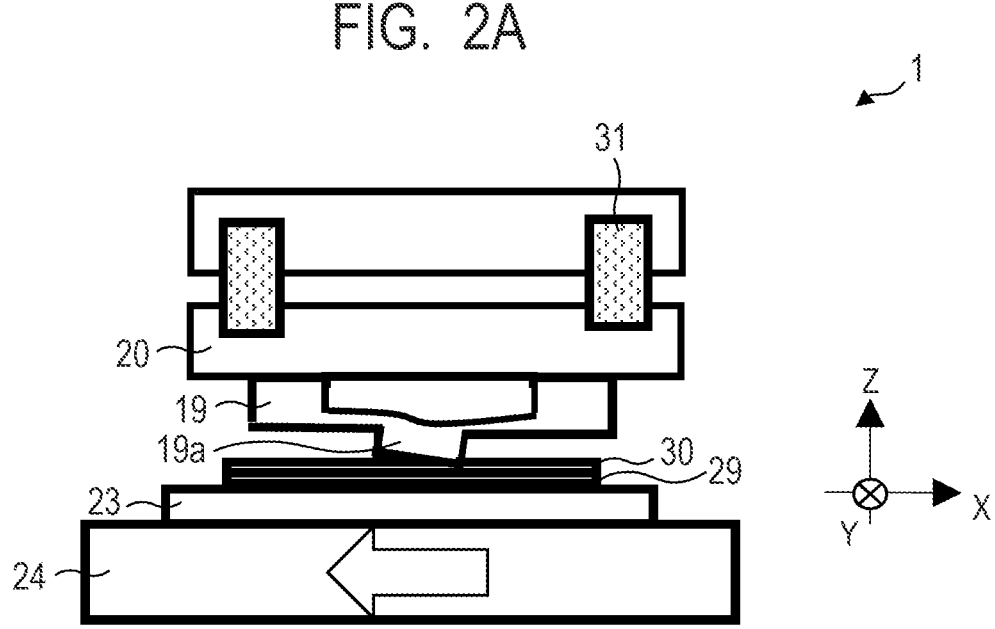
FIG. 2A is a partially enlarged cross-sectional view of the imprint apparatus according to the first embodiment when a mold and a substrate are brought into contact with each other.
Figure 2B:
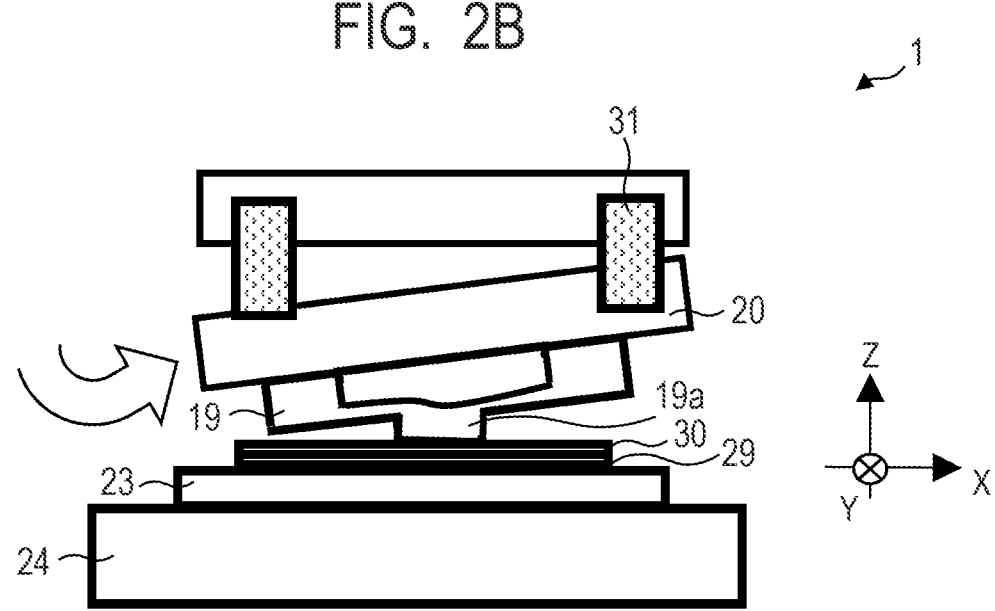
FIG. 2B is a partially enlarged cross-sectional view of the imprint apparatus according to the first embodiment when a mold and a substrate are brought into contact with each other.

FIGS. 2A and 2B show partially enlarged cross-sectional views of the imprint apparatus 1 according to the present embodiment when the mold 19 and the imprint material 30 on the substrate 29 are brought into contact with each other.

Specifically, for example, as shown in FIG. 2A, the X stage 24 moves in the −X direction after the pattern region 19a of the mold 19 and the imprint material 30 on the substrate 29 are brought into contact with each other, in order to reduce the relative position deviation between the mold 19 and the substrate 29 measured by the alignment measuring unit 8.

When the alignment between the mold 19 and the substrate 29 is performed by moving the X stage 24 in the −X direction, a force along a shearing direction (here, the X direction) is applied to the pattern region 19a of the mold 19.

As a result, the pattern region 19a of the mold 19 rotates around the Y axis, namely it has a predetermined tilt in the $\theta_Y$ direction, as shown in FIG. 2A.

At this time, the mold driving unit 31 performs tilt driving of the mold holding unit 20, namely it rotates the mold holding unit 20 about the Y-axis to correct this tilt in the pattern region 19a of the mold 19 in the imprint apparatus 1 according to the present embodiment, as shown in FIG. 2B.

Thereby, it is possible to reduce the relative tilt between the pattern region 19a of the mold 19 and the substrate 29.

Here, a position variation amount of the substrate stage 4 when the relative position deviation between the mold 19 and the substrate 29 is reduced as described above also includes an influence of deformations of the Y stage 23 and the X stage 24 provided between the substrate 29 and a position where the position measurement is performed in the substrate stage 4.

In addition, the shearing force applied to the pattern region 19a of the mold 19 by the movement of the substrate stage 4, the relative tilt between the pattern region 19a of the mold 19 and the substrate 29, and the tilt driving amount required for the mold holding unit 20 also depend on a moving distance and a moving speed in the movement of the substrate stage 4.

Accordingly, the imprint apparatus 1 according to the present embodiment performs the tilt driving of the mold holding unit 20 by the mold driving unit 31 by feeding back driving forces by the Y actuator 41 and the X actuator 42 which are applied to the Y stage 23 and the X stage 24 of the substrate stage 4 to the mold driving unit 31.

FIG. 3 shows a flowchart illustrating the imprint process in the imprint apparatus 1 according to the present embodiment.

First, when the imprint process is started in the imprint apparatus 1 according to the present embodiment, an imprint condition is set (step S110).

Note that the imprint condition (a parameter) herein includes a material of the imprint material 30, a thickness of the imprint material 30 on the substrate surface, a size of a shot region, a layout of the shot regions, an order of the shot regions to be subjected to the imprint process and the like, for example.

In the step S110, a tilt correction coefficient described in detail below is determined from the set imprint condition.

Specifically, in the step S110, the tilt correction coefficient can be determined by using a result of the imprint process previously performed under the same imprint condition in the imprint apparatus 1 according to the present embodiment.

Accordingly, when the imprint process is performed for the first time under a different imprint condition, it is preferred to confirm a result by performing the imprint process on a test substrate or the like under the different imprint condition in advance.

In the step S110, the tilt correction coefficient may be determined by performing a simulation based on the set imprint condition.

Next, the substrate 29 is moved by driving the substrate stage 4 to a position (a supplying area) where the supplying unit 5 supplies the imprint material 30 to a shot region on the substrate 29 where a pattern is to be formed by the imprint process (step S111).

After the substrate stage 4 is moved to the position in the step S111, the imprint material 30 is supplied onto the shot region by the supplying unit 5 with moving the substrate 29 (step S112).

Next, the substrate 29 is moved by driving the substrate stage 4 such that a predetermined shot region among the shot regions to which the imprint material 30 has been supplied in the step S112 is arranged at a position facing the pattern region 19a of the mold 19 (step S113).

Then, the mold driving unit 31 is driven to lower the mold 19 such that the imprint material 30 on the predetermined shot region and the pattern region 19a of the mold 19 are brought into contact with each other (step S114, a contacting step).

Next, a relative position deviation amount between the mold 19 and the substrate 29 is measured by the alignment measuring unit 8, and the Y stage 23 and the X stage 24 are moved so as to reduce the measured relative position deviation amount to start an alignment between the mold 19 and the substrate 29 (step S115, start of a position correction process). That is, in the step S115, the alignment between the mold 19 and the substrate 29 is started based on measurement results of positions of alignment marks formed on the mold 19 and the substrate 29 by the alignment measuring unit 8.

Then, values of driving forces of the Y actuator 41 and the X actuator 42 when the Y stage 23 and the X stage 24 are moved in the step S115, namely command values of the driving forces from the substrate controller 10 are obtained (step S116, an obtaining step).

Then, the mold holding unit 20 is rotated by the mold driving unit 31 in order to correct a tilt in the pattern region 19a of the mold 19 generated by movements of the Y stage 23 and the X stage 24 in the step S115 (step S117, a tilt correcting step).

A calculation of a rotation amount of the mold holding unit 20, namely a tilt variation amount of the mold 19 in the step S117 will be described in detail later.

Thereafter, the alignment between the mold 19 and the substrate 29 by the movements of the Y stage 23 and the X stage 24 is ended (step S118, end of the position correction process).

Next, an exposure is performed by irradiating the imprint material 30 on the predetermined shot region of the substrate 29 with curing light 12 using the illuminating unit 2 (step S119).

After the exposure is performed in the step S119, the mold driving unit 31 is driven to lift the mold 19 such that the mold 19 is separated from the imprint material 30 on the predetermined shot region of the substrate 29 (step S120). Thereby, a pattern of the cured imprint material 30 is formed on the predetermined shot region of the substrate 29.

Next, it is determined whether or not the exposure process in the steps S113 to S120 has been performed on all shot regions of the substrate 29 on which the pattern is to be formed (step S121).

If there is a shot region on which the exposure process has not been performed (No in the step S121), the process returns to step S113, and the exposure process is performed on the shot region.

On the other hand, when the exposure process has been performed on all the shot regions of the substrate 29 (Yes in the step S121), the process proceeds to step S122.

In the step S122, it is determined whether or not the imprint condition set in the step S110, namely the material of the imprint material 30, the thickness of the imprint material 30, the size of the shot region, the layout of the shot regions, the order of the shot regions in which the imprint process is performed and the like is a new condition.

If the imprint condition is not the new condition (No in the step S122), the imprint process on the substrate 29 is ended.

On the other hand, when the imprint condition is the new condition (Yes in the step S122), the process proceeds to step S123.

In the step S123, an overlay position deviation amount on the substrate 29 on which the pattern of the imprint material 30 is formed is confirmed in order to calculate the tilt correction coefficient under the new imprint condition.

Specifically, a high magnification scope (not illustrated) provided in the imprint apparatus 1 is used to measure the position deviation amount of each mark formed in the shot region of the substrate 29 on which the pattern of the imprint material 30 is formed.

In the step S123, the position deviation amount of each mark formed in the shot region of the substrate 29 may be measured by using a measuring device provided outside the imprint apparatus 1 after the substrate 29 on which the pattern of the imprint material 30 is formed is carried-out from the imprint apparatus 1.

The overlay position deviation amount measured in the step S123 includes several components such as a shift component, a magnitude component, a torsion component, a rotation component and a tilt component.

Here, a tilt component in the substrate surface which affects a distortion in the shot region is extracted among such components.

The reason for this is that a distortion amount in the shot region changes by 0.5 nanometers when the tilt variation amount of the mold 19 is 1 microradian, for example, under a predetermined imprint condition, namely it is found that a distortion variation amount in the shot region depends on the tilt variation amount of the mold 19.

Accordingly, the tilt variation amount of the mold 19 is calculated from a magnitude of the distortion in the shot region in the imprint apparatus 1 according to the present embodiment.

When the material of the imprint material 30 is new in the imprint condition, it is better to confirm a relation between the distortion and the tilt variation amount by performing the exposure process on each of the plurality of substrates 29 with making the tilt variation amounts of the mold 19 different from each other, for example.

As described above, in the step S123, the distortion in the shot region is extracted from the measured overlay position deviation amount on the substrate 29, and the tilt variation amount of the mold 19 is calculated from the extracted distortion in the shot region.

Then, the driving forces of the Y actuator 41 and the X actuator 42 obtained in the step S116 and the calculated tilt variation amount of the mold 19 are compared with each other.

Specifically, the driving force in the X direction by the X actuator 42, and the tilt variation amount of the mold 19 corresponding to the driving force, namely an angle of the mold 19 formed with respect to the X direction (the angle in the rotation direction around the Y axis) are represented by $F_X$ and $T_X$, respectively.

Similarly, the driving force in the Y direction by the Y actuator 41, and the tilt variation amount of the mold 19 corresponding to the driving force, namely an angle of the mold 19 formed with respect to the Y direction (the angle in the rotation direction about the X axis) are represented by $F_Y$ and $T_Y$, respectively.

At this time, by substituting these values into the following expressions (1) and (2), proportional coefficients, namely tilt correction coefficients $C_X$ and $C_Y$ are calculated (step S124, a determining step).

$$T_X = C_X \times F_X \tag{1}$$

$$T_Y = C_Y \times F_Y \tag{2}$$

Here, the tilt variation amounts $T_X$ and $T_Y$ of the mold 19 can be calculated as driving forces applied to a plurality of actuators provided in the mold driving unit 31.

In addition, the driving forces $F_X$ and $F_Y$ of the X actuator 42 and the Y actuator 41 can be calculated as a command value from the substrate controller 10.

Here, the tilt correction coefficients $C_X$ and $C_Y$ are constants which are not affected from other axes.

Although the tilt correction coefficients $C_X$ and $C_Y$ are calculated for each shot region in the above description, the present invention is not limited to this.

For example, the tilt correction coefficients $C_X$ and $C_Y$ may be determined so as to reduce an error by collectively performing a least squares method on all shot regions on which the imprint process of the substrate 29 has been performed.

Further, the tilt correction coefficients $C_X$ and $C_Y$ may be determined in accordance with a region where the imprint process has been performed in the shot region.

That is, the tilt correction coefficients $C_X$ and $C_Y$ may be determined so as to minimize the error between the shot regions for which the imprint process has been performed on an entire region, for example.

Further, the tilt correction coefficients $C_X$ and $C_Y$ may be determined so as to minimize the error between the shot regions for which the imprint process has been performed on a predetermined partial region.

As an example, when the driving force $F_X$ in the X direction is 3 N and the tilt variation amount $T_X$ at that time is 1.5 microradian under a predetermined imprint condition, $C_X$ is calculated as 0.5 microradian/N by substituting them into the expression (1).

Then, the tilt correction coefficients $C_X$ and $C_Y$ for the tilt correction in the mold 19 calculated in the step S124 are reflected in the imprint condition set in the step S110.

FIG. 4 shows an example of time dependence of each of the driving force F of the X actuator 42 and the tilt T of the mold holding unit 20 when the X stage 24 is moved in the steps S115 to S118 of the imprint process by the imprint apparatus 1 according to the present embodiment.

The time dependence shown herein is the same for the driving force of the Y actuator 41 when the Y stage 23 is moved.

As shown in FIG. 4, when the mold 19 is lowered in the step S114, a predetermined driving force $F_1$ is generated by the X actuator 42 in order to stop the substrate stage 4 immediately below the mold 19.

In the step S114, the tilt T of the mold holding unit 20 is assumed to be $T_1$.

Next, in the step S115 in which the movement of the X stage 24 is started after the mold 19 and the substrate 29 are brought into contact with each other, a shearing force is generated in a shearing direction (the X direction) in the X stage 24, and thus the driving force F of the X actuator 42 starts to change with time.

Then, a predetermined driving force $F_2$ is generated by the X actuator 42 at the time $t_a$ immediately before the step S118 at which the movement of the X stage 24 is finished.

Information of the driving force $F_2$ obtained in the step S116 is transmitted from the substrate controller 10 to the mold controller 7, and the mold controller 7 rotates the mold holding unit 20 by the tilt variation amount $T_X$ calculated from the above-described expression (1) using the mold driving unit 31 based on the received information.

Thereby, the tilt T of the mold holding unit 20 changes from $T_1$ to $T_2$. Note that a timing at which the mold holding unit 20 is rotated by the mold driving unit 31 may be any timing between the measurement of the driving force F by the X actuator 42 at the time $t_a$ and the start of the exposure in the step S119.

In this way, by changing the tilt of the mold holding unit 20 to correct a relative tilt between the mold 19 and the substrate 29 before starting the exposure, it is possible to reduce an influence of the relative tilt, namely a distortion in a pattern of the imprint material 30 formed on the substrate 29.

As described above, in the imprint process in the imprint apparatus 1 according to the present embodiment, the tilt variation amounts $T_X$ and $T_Y$ of the mold 19 are determined from the driving forces $F_X$ and $F_Y$ by the Y actuator 41 and the X actuator 42 in the steps S115 and S116, and the tilt correction coefficients $C_X$ and $C_Y$ determined from the imprint condition.

Then, the distortion caused by the relative tilt between the mold 19 and the substrate 29 can be reduced to improve an overlay accuracy by performing the exposure process after the mold 19 is rotated by the tilt variation amounts $T_X$ and $T_Y$ determined in the step S117.

The calculation of the tilt correction coefficient in the step S124 is not limited to the above-described method using actually measured values, and may be performed based on a simulation result.

The tilt correction coefficient is calculated in the step S124 when the imprint condition is new in the imprint apparatus 1 according to the present embodiment, but the present invention is not limited to this.

That is, the step S124 may be performed in order to increase an accuracy of the tilt correction coefficient under the same imprint condition in the imprint apparatus 1 according to the present embodiment.

Further, the tilt variation amounts $T_X$ and $T_Y$ of the mold 19 are determined from the driving forces $F_X$ and $F_Y$ by the Y actuator 41 and the X actuator 42 as shown in the expressions (1) and (2) in the above description, but the present invention is not limited thereto.

That is, an amount affected by deformations of the Y stage 23 and the X stage 24 is sufficiently reduced by appropriately changing a material of the imprint material 30 or by measuring positions of the Y stage 23 and the X stage 24 at positions close to the substrate 29.

In this case, the tilt variation amounts $T_X$ and $T_Y$ of the mold 19 can be determined from position variation amounts of the Y stage 23 and the X stage 24, namely driving amounts of the Y stage 23 and the X stage 24 instead of the driving forces $F_X$ and $F_Y$ by the Y actuator 41 and the X actuator 42 to be fed back to the mold driving unit 31.

The control for reducing the tilt variation of the mold 19 generated when the substrate stage 4 is driven so as to reduce the relative position deviation amount between the mold 19 and the substrate 29 in the step S115 has been described above.

However, the present invention is not limited thereto, and the imprint apparatus 1 according to the present embodiment can also be applied to a case of calculating to correct the tilt variation amount of the mold 19 from a shearing force in a shearing directions (X direction and Y direction) applied to the substrate 29 by bringing the mold 19 and the imprint material 30 on the substrate 29 into contact with each other, for example.

That is, when the pattern region 19a of the mold 19 is brought into contact with the imprint material 30 on the substrate 29 in a state in which the mold 19 has a relative tilt with respect to the substrate 29, the shearing force in the shearing direction (X direction and Y direction) due to the contact may be applied to the substrate 29 in addition to a driving force for stopping the substrate stage 4.

In this case, the relative tilt of the mold 19 with respect to the substrate 29, namely the tilt variation amount of the mold 19 can be calculated from the applied shearing force based on the above-described discussion.

By rotating the mold 19 so as to correct the calculated tilt variation amount, the relative tilt between the mold 19 and the substrate 29 can be reduced.

In other words, in the imprint apparatus 1 according to the present embodiment, the driving forces by the Y actuator 41 and the X actuator 42 are obtained after the pattern region 19a of the mold 19 and the imprint material 30 on the substrate 29 are brought into contact with each other.

Then, the relative tilt between the mold 19 and the substrate 29 can be reduced by calculating the tilt variation amount of the mold 19 from magnitudes of the obtained driving forces to rotate the mold 19 so as to correct the calculated tilt variation amount.

In the above description, the driving forces $F_X$ and $F_Y$ by the Y actuator 41 and the X actuator 42 are calculated as a command value from the substrate controller 10, but the present invention is not limited thereto. For example, they may be measured by providing a strain gauge or the like on the substrate 29 or the Y stage 23 which holds the substrate 29.

Second Embodiment

Figure 5:
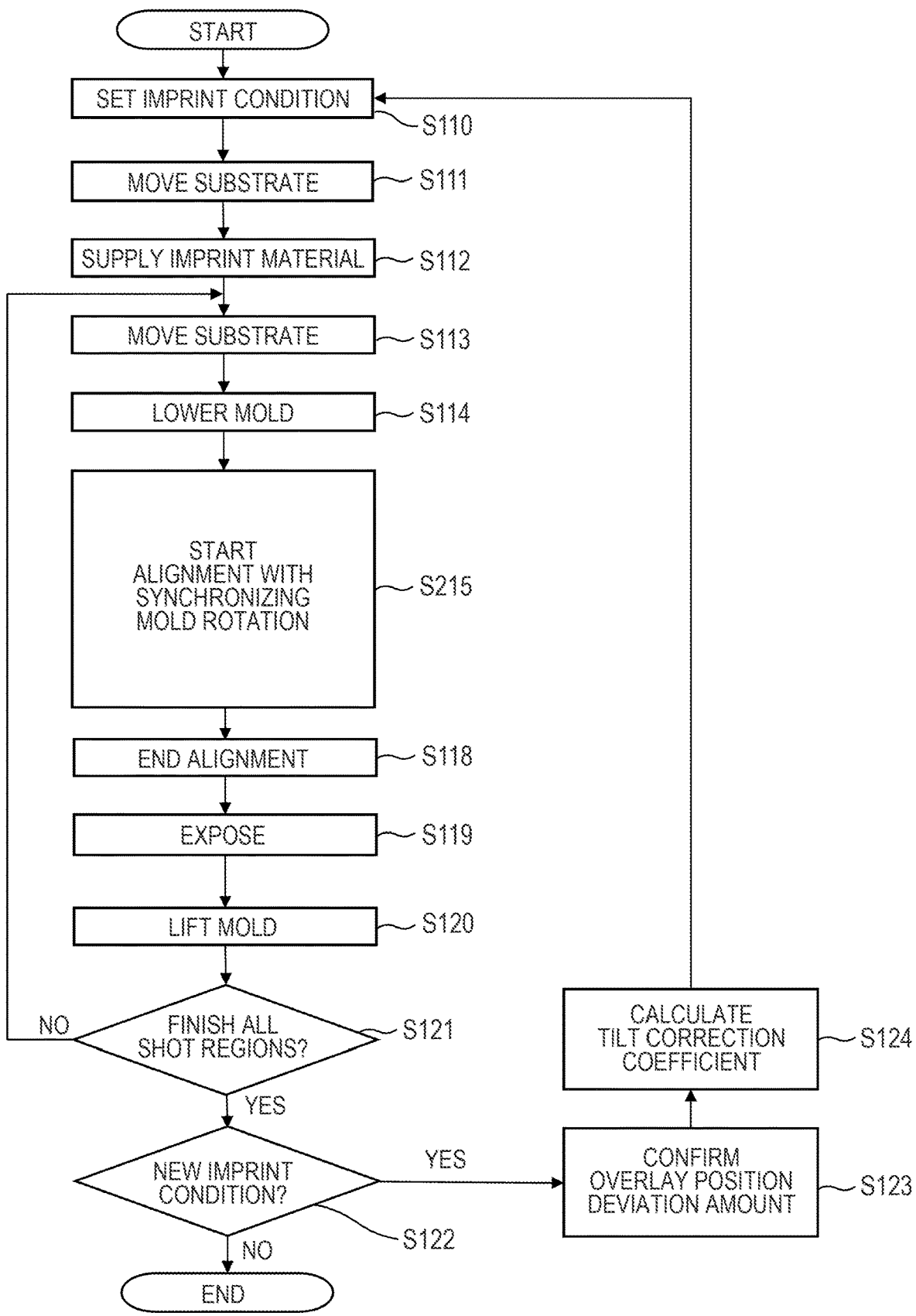
FIG. 5 is a flowchart showing an imprint process in an imprint apparatus according to a second embodiment of the present invention.

FIG. 5 shows a flowchart illustrating an imprint process in an imprint apparatus according to a second embodiment of the present invention.

Since the imprint apparatus according to the present embodiment has the same structure as the imprint apparatus 1 according to the first embodiment, the same members are denoted by the same reference numerals, and a description thereof is omitted.

As shown in FIG. 5, the imprint process in the imprint apparatus according to the present embodiment is identical to the imprint process in the imprint apparatus 1 according to the first embodiment except that a step S215 is performed instead of the steps S115 to S117.

Thus, descriptions of the steps S110 to S114 and the steps S118 to S124 are omitted, and only the step S215 is described below.

In the step S215, movements of the Y stage 23 and the X stage 24 for reducing a relative position deviation between the mold 19 and the substrate 29 and a rotation of the mold holding unit 20 for correcting a tilt in the pattern region 19a of the mold 19 are performed in synchronization with each other.

That is, in the step S215, the rotation of the mold holding unit 20 is performed after the movements of the Y stage 23 and the X stage 24 are performed.

Then, after the movements of the Y stage 23 and the X stage 24 are performed in order to reduce the relative position deviation between the mold 19 and the substrate 29 caused again by the rotation of the mold holding unit 20, the rotation of the mold holding unit 20 is performed in order to correct the tilt in the pattern region 19a of the mold 19 caused again by the movements of the Y stage 23 and the X stage 24.

Such a repeated operation is performed until the relative position deviation between the mold 19 and the substrate 29 becomes equal to or less than a predetermined threshold value and the relative tilt between the mold 19 and the substrate 29 becomes equal to or less than a predetermined threshold value.

Note that the present invention is not limited thereto, the repeated operation may be performed until a temporal variation amount of the relative position deviation between the mold 19 and the substrate 29 becomes equal to or less than a predetermined threshold value and a temporal variation amount of the relative tilt between the mold 19 and the substrate 29 becomes equal to or less than a predetermined threshold value.

Here, in the step S215, the rotation operation of the mold holding unit 20 may be performed over an entire period from a start to an end of the movements of the Y stage 23 and the X stage 24.

Further, in the step S215, the rotation operation of the mold holding unit 20 may be performed intermittently, for example, every 0.1 seconds between the start and the end of the movements of the Y stage 23 and the X stage 24.

Note that the case where the movements and the rotation are synchronized with each other such that the rotation operation of the mold holding unit 20 is performed only once immediately before the end of the movements of the Y stage 23 and the X stage 24 in the step S215 corresponds to the position correction process in the imprint process in the imprint apparatus 1 according to the first embodiment.

As described above, in the imprint process performed by the imprint apparatus according to the present embodiment, the tilt variation amounts $T_X$ and $T_Y$ of the mold 19 are determined with synchronizing the movements of the Y stage 23 and the X stage 24 with the rotation of the mold holding unit 20 in the step S215.

By performing an exposure process after the relative position deviation between the mold 19 and the substrate 29 becomes equal to or less than a predetermined threshold value and the relative tilt between the mold 19 and the substrate 29 becomes equal to or less than a predetermined threshold value, it is possible to reduce a distortion caused by the relative tilt between the mold 19 and the substrate 29 to improve an overlay accuracy.

According to the present invention, it is possible to provide an imprint apparatus capable of effectively reducing the relative tilt between the mold and the substrate when a pattern of the imprint material is formed.

Article Manufacturing Method

A pattern of a cured product formed by using the imprint apparatus according to the present invention is used permanently in at least a part of various articles or temporarily when manufacturing the various articles.

Examples of the article include an electric circuit element, an optical element, a MEMS, a recording element, a sensor and a mold.

Further, examples of the electric circuit element include volatile or non-volatile semiconductor memories such as a dynamic random access memory (DRAM), a static random access memory (SRAM), a flash memory and a magnetoresistive random access memory (MRAM), and semiconductor elements such as a large scale integration (LSI), a charge coupled device (CCD), an image sensor and a field programmable gate array (FPGA).

Furthermore, an example of the mold includes a mold for imprinting.

The pattern of the cured product formed by using the imprint apparatus according to the present invention is used as it is as a constituent member of at least a part of the above-described article.

Alternatively, the pattern of the cured product is temporarily used as a resist mask, and the resist mask is removed after etching, ion implantation or the like is performed in a step for processing a substrate.

Although preferred embodiments have been described above, the present invention is not limited to these embodiments, and various modifications and changes can be made within the gist of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-183520, filed Nov. 10, 2021, which is hereby incorporated by reference herein in its entirety.

What is claimed is:

1. An imprint apparatus for forming a pattern to an imprint material on a substrate by using a mold, the imprint apparatus comprising:
a mold holding unit configured to hold the mold;
a mold driving unit configured to move the mold holding unit;
a substrate holding unit configured to hold the substrate;
a substrate driving unit configured to move the substrate holding unit; and
a controller programmed to control the mold driving unit and the substrate driving unit to perform:
a contacting step of moving at least one of the mold holding unit and the substrate holding unit by at least one of the mold driving unit and the substrate driving unit such that the mold and the imprint material on a substrate surface are brought into contact with each other;
an obtaining step of obtaining a driving force applied to the substrate holding unit in a first direction parallel to the substrate surface by the substrate driving unit to move the substrate holding unit after performing the contacting step; and
a tilt correcting step of reducing a relative tilt between the mold and the substrate by the mold driving unit based on the driving force obtained in the obtaining step and a predetermined parameter including at least one of a size of a shot region on the substrate surface on which the pattern of the imprint material is formed, and an order of the shot regions on the substrate surface on which the pattern of the imprint material is formed.

2. The imprint apparatus according to claim 1, further comprising a position measuring unit configured to measure a position of each of a first mark formed on the mold and a second mark formed on the substrate in a plane parallel to the substrate surface,
wherein the controller is programmed to perform a position correcting step of causing the position measuring unit to measure a relative position between the first mark and the second mark, and causing the substrate driving unit to move the substrate holding unit in the plane based on the measured relative position, after performing the contacting step, and
wherein the controller is programmed to perform the obtaining step after performing the position correcting step.

3. The imprint apparatus according to claim 1, wherein when T represents a magnitude of an angle by which the mold holding unit is rotated in the tilt correcting step, F represents a magnitude of the driving force obtained in the obtaining step, and C represents a proportionality coefficient in an expression of T=C×F, the controller is programmed to perform a determining step of determining the proportionality coefficient based on the predetermined parameter.

4. The imprint apparatus according to claim 1, wherein the predetermined parameter further includes at least one of a thickness of the imprint material on the substrate surface, and a layout of the shot regions on the substrate surface.

5. The imprint apparatus according to claim 3, wherein the controller is programmed to perform the determining step based on a result of a previously performed process of forming the pattern of the imprint material in which the predetermined parameter is the same.

6. The imprint apparatus according to claim 3, wherein the controller is programmed to perform the determining step based on a result of a simulation using the predetermined parameter.

7. The imprint apparatus according to claim 1, wherein the controller is programmed to perform the tilt correcting step after finishing the obtaining step.

8. The imprint apparatus according to claim 1, wherein the controller is programmed to repeatedly perform the obtaining step and the tilt correcting step until a relative position deviation between the mold and the substrate becomes equal to or less than a predetermined threshold value and the relative tilt between the mold and the substrate becomes equal to or less than a predetermined threshold value.

9. An article manufacturing method for manufacturing an article from a processed substrate, the article manufacturing method comprising:
a step of forming a pattern of an imprint material on a substrate using a mold by using the imprint apparatus according to claim 1; and
a step of processing the substrate on which the pattern is formed.

10. A method for forming a pattern to an imprint material on a substrate by using a mold in an imprint apparatus including a mold holding unit configured to hold the mold, a mold driving unit configured to move the mold holding unit, a substrate holding unit configured to hold the substrate, and a substrate driving unit configured to move the substrate holding unit, the method comprising:
a contacting step of moving at least one of the mold holding unit and the substrate holding unit by at least one of the mold driving unit and the substrate driving unit such that the mold and the imprint material on a substrate surface are brought into contact with each other;
an obtaining step of obtaining a driving force applied to the substrate holding unit in a first direction parallel to the substrate surface by the substrate driving unit to move the substrate holding unit after performing the contacting step; and
a tilt correcting step of reducing a relative tilt between the mold and the substrate by the mold driving unit based on the driving force obtained in the obtaining step and a predetermined parameter including at least one of a size of a shot region on the substrate surface on which the pattern of the imprint material is formed, and an order of the shot regions on the substrate surface on which the pattern of the imprint material is formed.

11. The method according to claim 10,
wherein the imprint apparatus includes a position measuring unit configured to measure a position of each of a first mark formed on the mold and a second mark formed on the substrate in a plane parallel to the substrate surface,
wherein the method includes a position correcting step of causing the position measuring unit to measure a relative position between the first mark and the second mark, and causing the substrate driving unit to move the substrate holding unit in the plane based on the measured relative position, after performing the contacting step, and wherein the obtaining step is performed after performing the position correcting step.

12. The method according to claim 10, further comprising a determining step of determining, when T represents a magnitude of an angle by which the mold holding unit is rotated in the tilt correcting step, F represents a magnitude of the driving force obtained in the obtaining step, and C represents a proportionality coefficient in an expression of T=C×F, the proportionality coefficient based on the predetermined parameter.

13. The method according to claim 10, wherein the predetermined parameter further includes at least one of a thickness of the imprint material on the substrate surface, and a layout of the shot regions on the substrate surface.

14. The method according to claim 12, wherein the determining step is performed based on a result of a previously performed process of forming the pattern of the imprint material in which the predetermined parameter is the same.

15. The method of claim 12, wherein the determining step is performed based on a result of a simulation using the predetermined parameter.

16. The method according to claim 10, wherein the tilt correcting step is performed after finishing the obtaining step.

17. The method according to claim 10, wherein the obtaining step and the tilt correcting step are repeatedly performed until a relative position deviation between the mold and the substrate becomes equal to or less than a predetermined threshold value and the relative tilt between the mold and the substrate becomes equal to or less than a predetermined threshold value.

* * * * *